US012002648B2

(12) United States Patent
Parker et al.

(10) Patent No.: US 12,002,648 B2
(45) Date of Patent: Jun. 4, 2024

(54) INTERRUPTION-RING IN AN X-RAY TUBE

(71) Applicant: Moxtek, Inc., Orem, UT (US)

(72) Inventors: Todd S. Parker, Kaysville, UT (US); Kasey Otho Greenland, South Jordan, UT (US)

(73) Assignee: Moxtek, Inc., Orem, UT (US)

( * ) Notice: Subject to any disclaimer, the term of this patent is extended or adjusted under 35 U.S.C. 154(b) by 0 days.

(21) Appl. No.: 18/311,683

(22) Filed: May 3, 2023

(65) Prior Publication Data

US 2023/0274904 A1 Aug. 31, 2023

Related U.S. Application Data

(63) Continuation of application No. 17/500,403, filed on Oct. 13, 2021, now Pat. No. 11,688,578.

(60) Provisional application No. 63/112,216, filed on Nov. 11, 2020.

(51) Int. Cl.
*H01J 35/16* (2006.01)

(52) U.S. Cl.
CPC ........... *H01J 35/16* (2013.01); *H01J 2235/02* (2013.01); *H01J 2235/16* (2013.01)

(58) Field of Classification Search
CPC ..... H01J 35/16; H01J 2235/02; H01J 2235/16
See application file for complete search history.

(56) References Cited

U.S. PATENT DOCUMENTS

| | | | | |
|---|---|---|---|---|
| 2,836,748 | A * | 5/1958 | Atlee | H01J 35/16 378/139 |
| 7,382,862 | B2 | 6/2008 | Bard et al. | |
| 2013/0077758 | A1 * | 3/2013 | Miller | H01J 35/14 378/139 |
| 2016/0126053 | A1 | 5/2016 | Ikarashi | |
| 2017/0213675 | A1 * | 7/2017 | Hartmann | H01H 33/66207 |
| 2019/0164708 | A1 * | 5/2019 | Hartmann | H01H 33/66261 |

* cited by examiner

*Primary Examiner* — Chih-Cheng Kao
(74) *Attorney, Agent, or Firm* — Thorpe North & Western, LLP.

(57) ABSTRACT

An x-ray tube 10 can have (a) an enclosure electrically-insulating a cathode 11 from an anode 12; (b) a coating-ring 18 on an inner-face of the enclosure, the coating-ring 18 encircling a longitudinal-axis 16 of the enclosure; and (c) an interruption-ring 19 located at the inner-face of the enclosure at a different location than the coating-ring 18. The interruption-ring 19 can encircle the longitudinal-axis 16 at a different location along the longitudinal-axis 16 with respect to the coating-ring 18. The interruption-ring 19 can encircle the longitudinal-axis 16 at a different radius from the longitudinal-axis 16 than the coating-ring 18. The coating-ring 18 and the interruption-ring 19 can reduce uneven electrical charge build-up on the inner-face of the enclosure, and can protect the triple-point.

18 Claims, 5 Drawing Sheets

15

INTERRUPTION-RING IN AN X-RAY TUBE

CLAIM OF PRIORITY

This application is a continuation of U.S. patent application Ser. No. 17/500,403, filed on Oct. 13, 2021, now U.S. Pat. No. 11,688,578, which claims priority to US Provisional Patent Application Number U.S. 63/112,216, filed on Nov. 11, 2020, which are incorporated herein by reference.

FIELD OF THE INVENTION

The present application is related generally to x-ray tubes.

BACKGROUND

An x-ray tube can make x-rays by sending electrons, across a voltage differential between a cathode and an anode, to a target of the anode. X-rays form as the electrons hit the target.

BRIEF DESCRIPTION OF THE DRAWINGS (DRAWINGS MIGHT NOT BE DRAWN TO SCALE)

Figure 1:
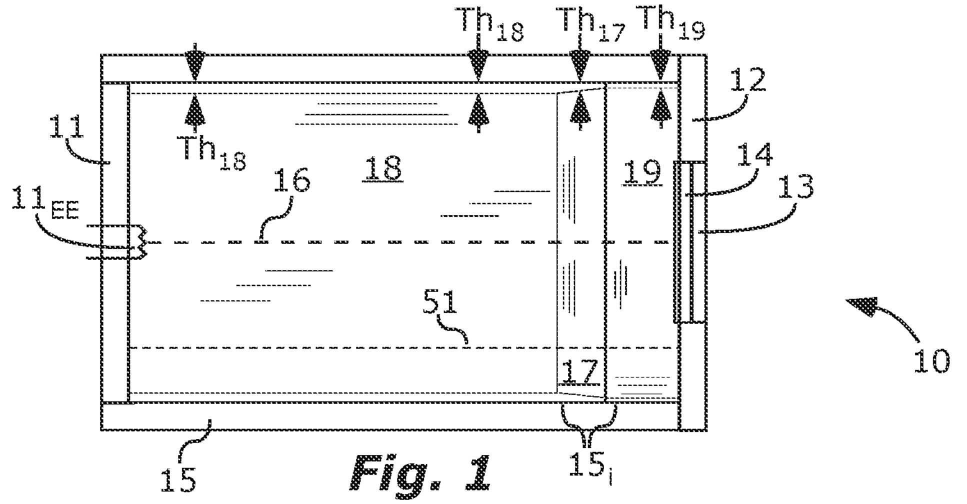

FIG. 1 is a cross-sectional side-view of an x-ray tube 10 with (a) a cylinder 15 that electrically insulates a cathode 11 from an anode 12; (b) a coating-ring 18 on an inner-face $\mathbf{15}_i$ of the cylinder 15; (c) an interruption-ring 19 at the inner-face $\mathbf{15}_i$ of the cylinder 15; and (d) a transition-region 17 between the interruption-ring 19 and the coating-ring 18.

Figure 2:
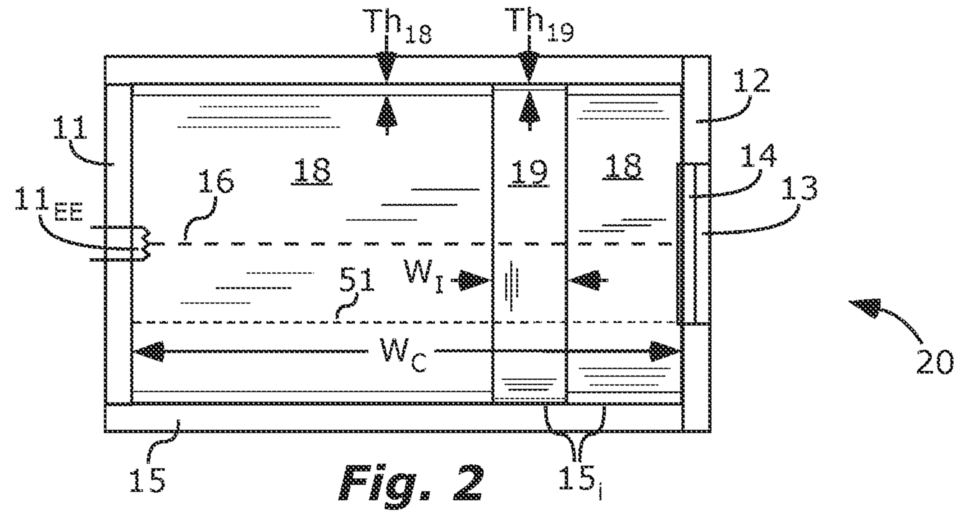

FIG. 2 is a cross-sectional side-view of an x-ray tube 20 with a coated cylinder 15, similar to the coated cylinder 15 of FIG. 1. The interruption-ring 19 in x-ray tube 20 is closer to the anode 12 than to the cathode 11, and is a region with a thinner coating than the coating-ring 18.

Figure 3:
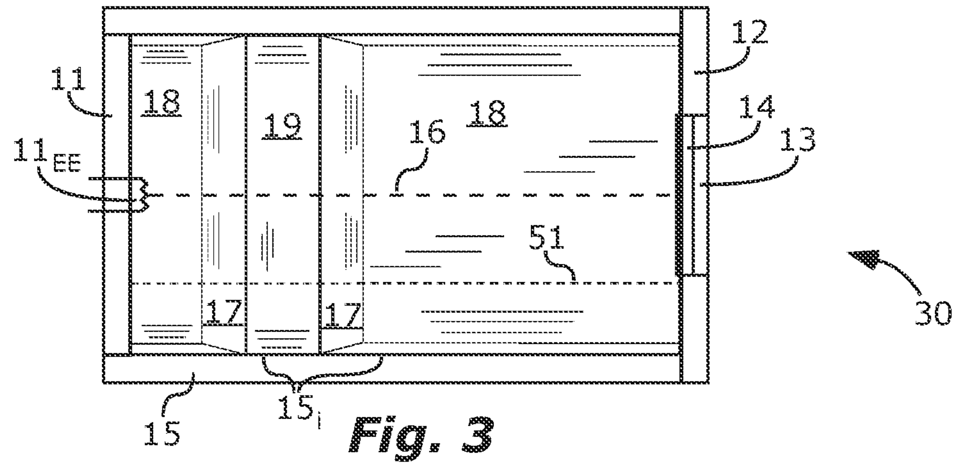

FIG. 3 is a cross-sectional side-view of an x-ray tube 30 with a coated cylinder 15, similar to the coated cylinders 15 of FIGS. 1-2. The interruption-ring 19 in x-ray tube 30 is closer to the cathode 11 than to the anode 12.

Figure 4:
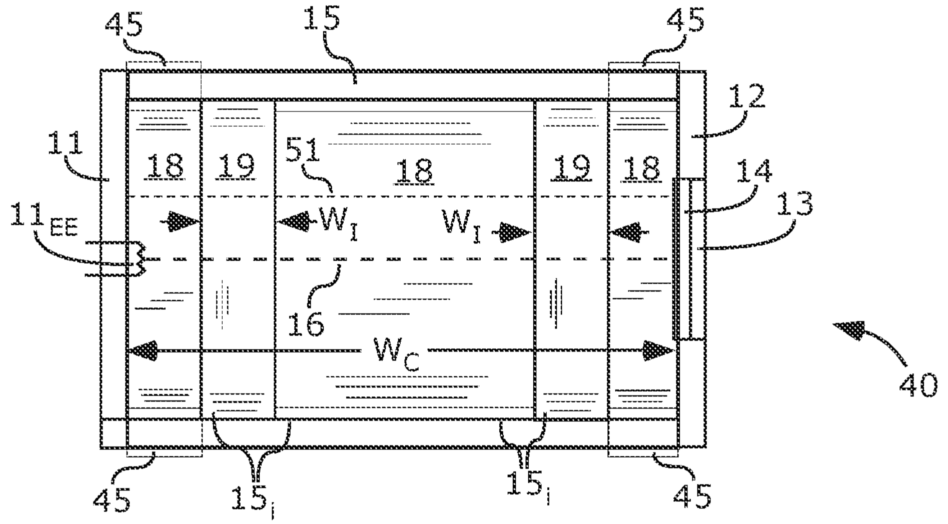

FIG. 4 is a cross-sectional side-view of an x-ray tube 40 with a coated cylinder 15, similar to the coated cylinders 15 of FIGS. 1-3. The cylinder 15 in x-ray tube 40 includes two interruption-rings 19.

Figure 5:
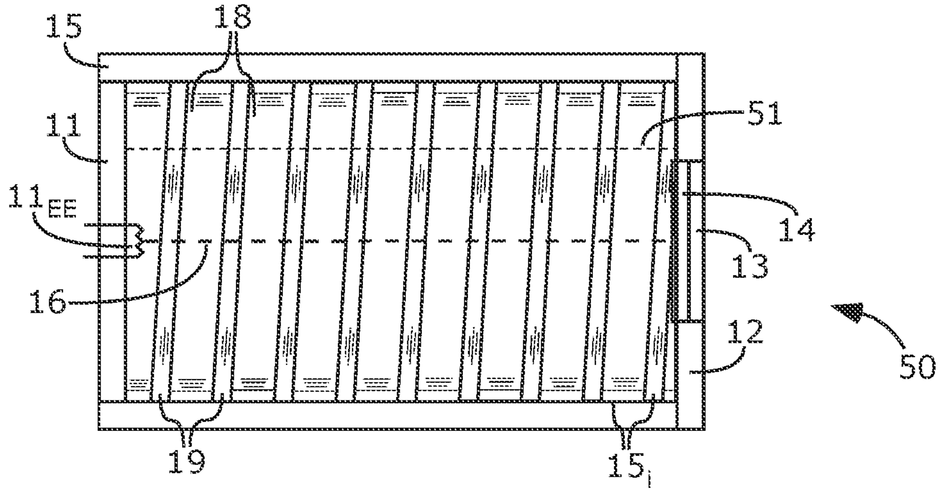

FIG. 5 is a cross-sectional side-view of an x-ray tube 50 with a coated cylinder 15, similar to the coated cylinders 15 of FIGS. 1-4. The interruption-ring 19 and the coating-ring 18 in x-ray tube 50 are adjacent helical rings on the inner-face $\mathbf{15}_i$ of the cylinder 15.

Figure 6:
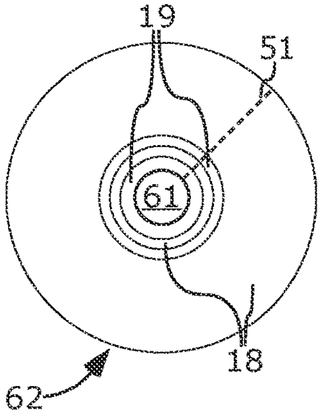

FIG. 6 is a top-view of coating-rings 18 and interruption-rings 19 on an inner-face $\mathbf{62}_i$ of an electrically insulative disc 62. The disc 62 encircles a region 61. The region 61 can be at least part of the cathode 11 or at least part of the anode 12.

Figure 7:
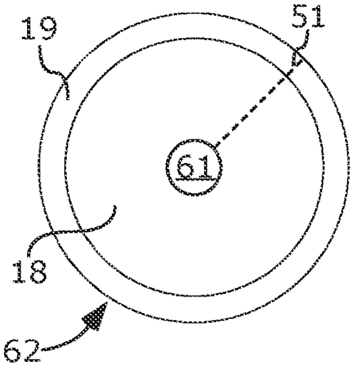

FIG. 7 is a top-view of a coating-ring 18 and an interruption-ring 19 on an inner-face $\mathbf{62}_i$ of an electrically insulative disc 62. The disc 62 encircles the region 61.

Figure 8:
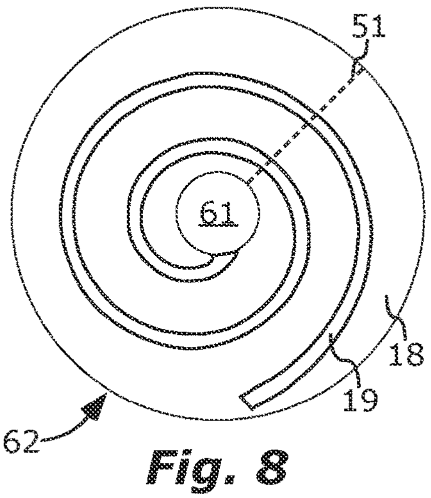

FIG. 8 is a top-view of a coating-ring 18 and an interruption-ring 19 as adjacent, spiral rings on an inner-face $\mathbf{62}_i$ of an electrically insulative disc 62. The disc 62 encircles region 61.

Figure 9:
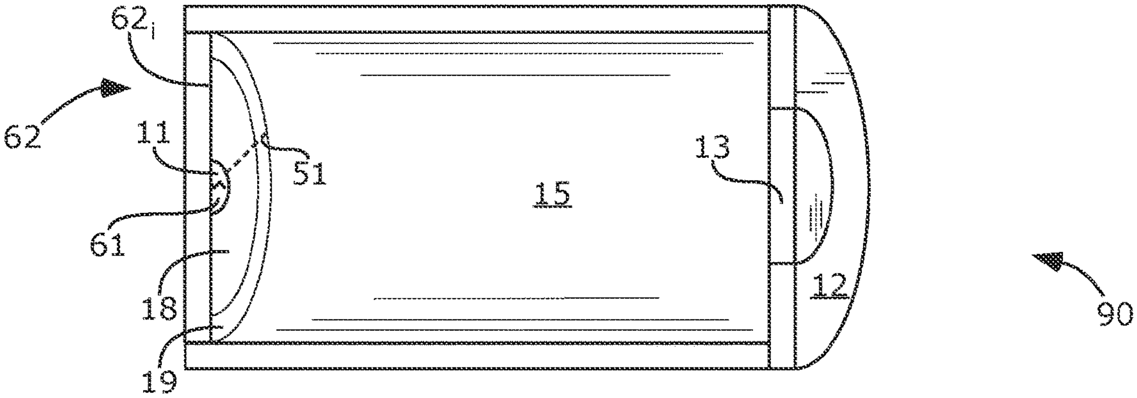

FIG. 9 is a cross-sectional perspective view of an x-ray tube 90 with a coated disc 62 encircling at least part of the cathode 11.

Figure 10:
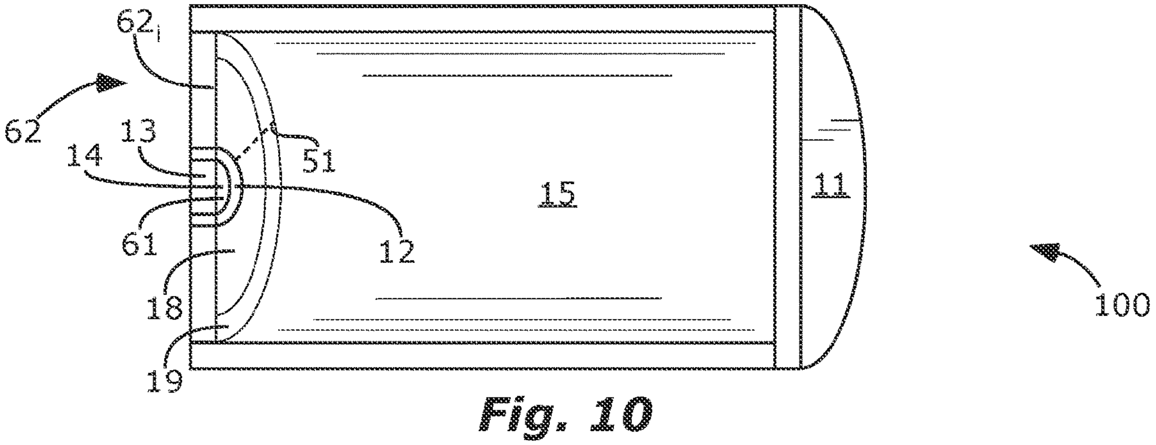

FIG. 10 is a cross-sectional perspective view of an x-ray tube 100 with a coated disc 62 encircling at least part of the anode 12.

Figure 11:
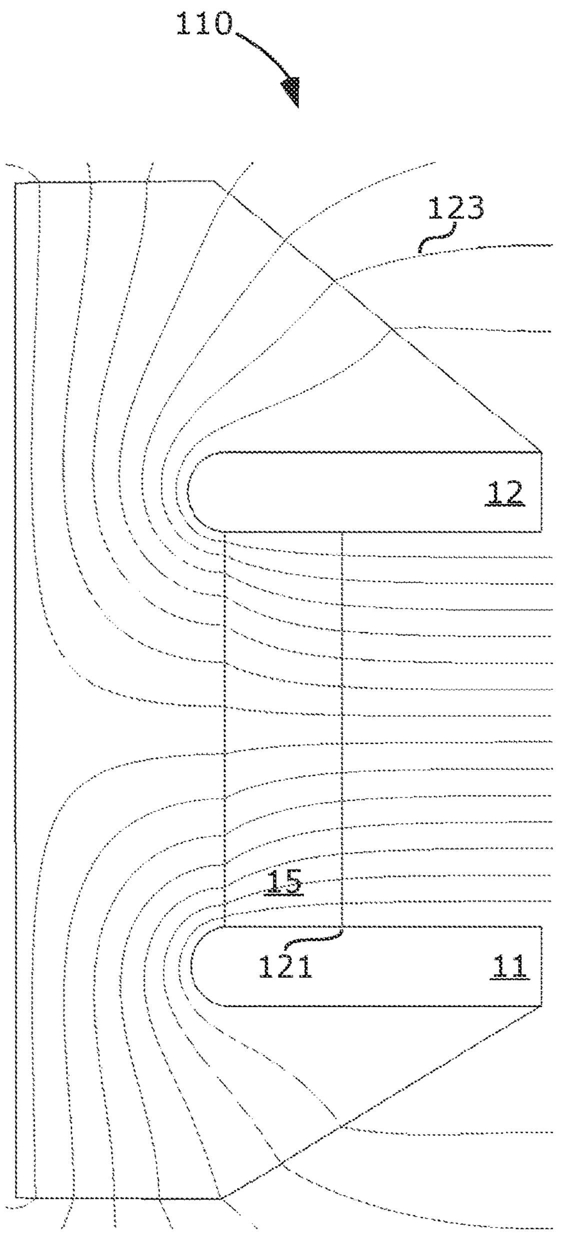

FIG. 11 is a partial cross-sectional side-view of half of an x-ray tube 110 plus equipotential lines 123. Half x-ray tube 110 has a coating-ring 18 (not shown in the figure).

Figure 12:
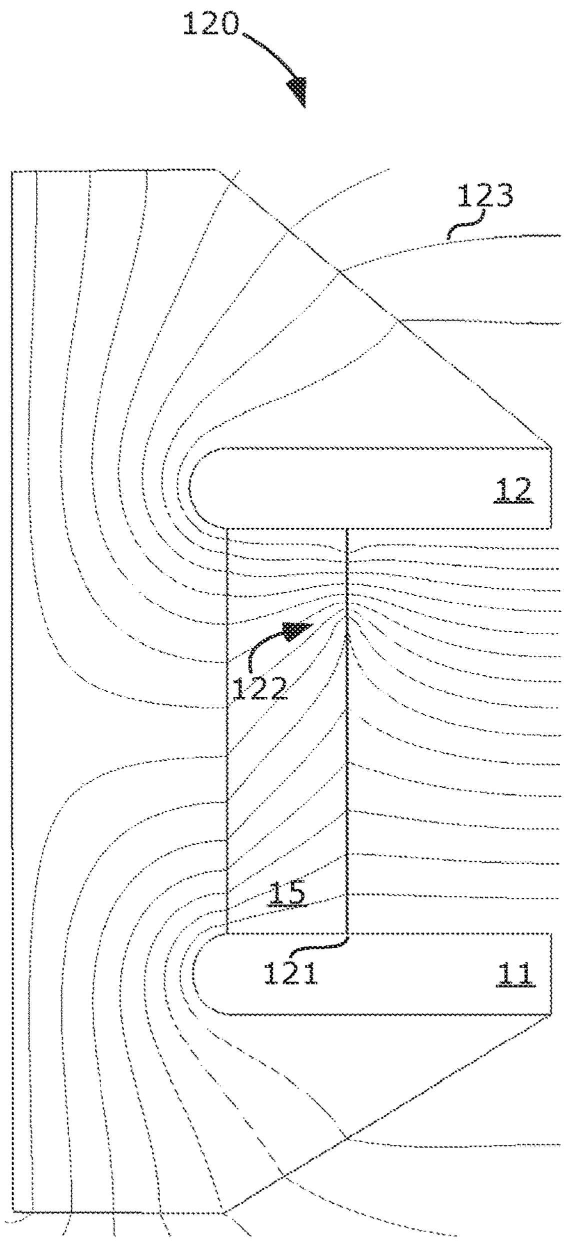

FIG. 12 is a partial cross-sectional side-view of half of an x-ray tube 120 plus electric equipotential lines 123. Half x-ray tube 120 has a coating-ring 18 and an interruption-ring 19 (neither shown in the figure).

Figure 13:
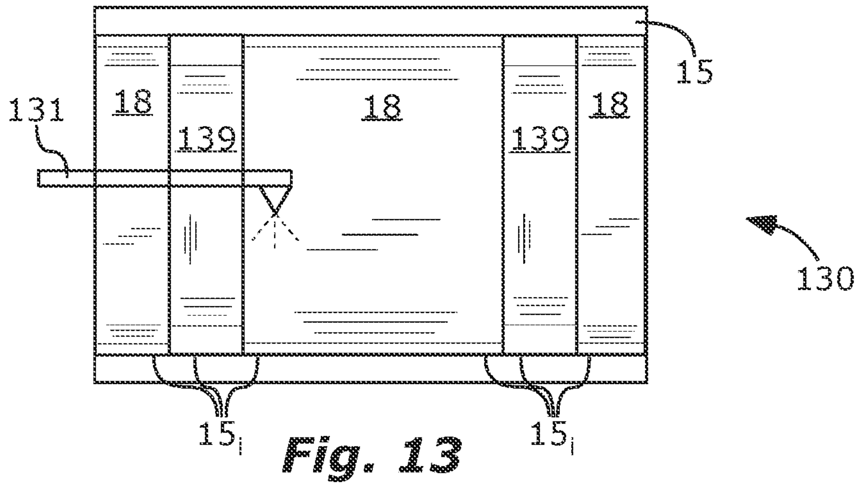

FIG. 13 is a cross-sectional side-view of a step 130 in a method of making an enclosure for an x-ray tube, including forming a coating-ring 18 and an interruption-ring 19 by masking a ring at an inner-face of the enclosure and coating an un-masked part of the inner-face.

Figure 14:
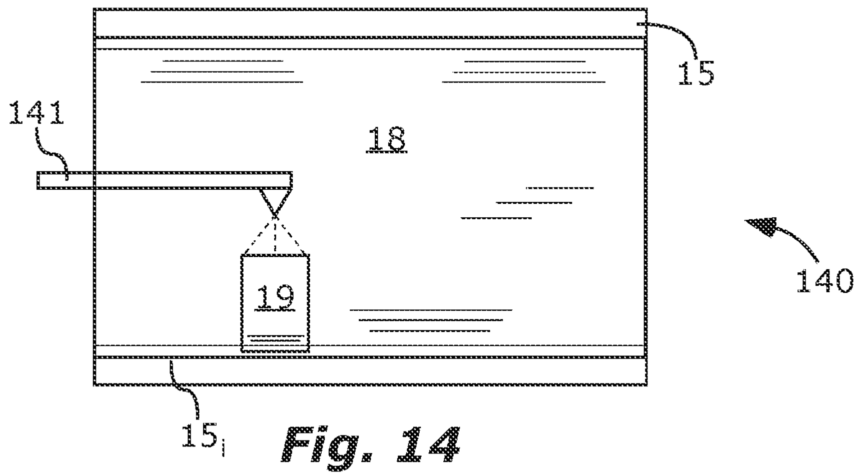

FIG. 14 is a cross-sectional side-view of a step 140 in a method of making an enclosure for an x-ray tube, including forming a coating-ring 18 and an interruption-ring 19 by coating the inner-face of the enclosure to form the coating-ring 18, then removing part or all of a ring of the coating to form the interruption-ring 19.

Figure 15:
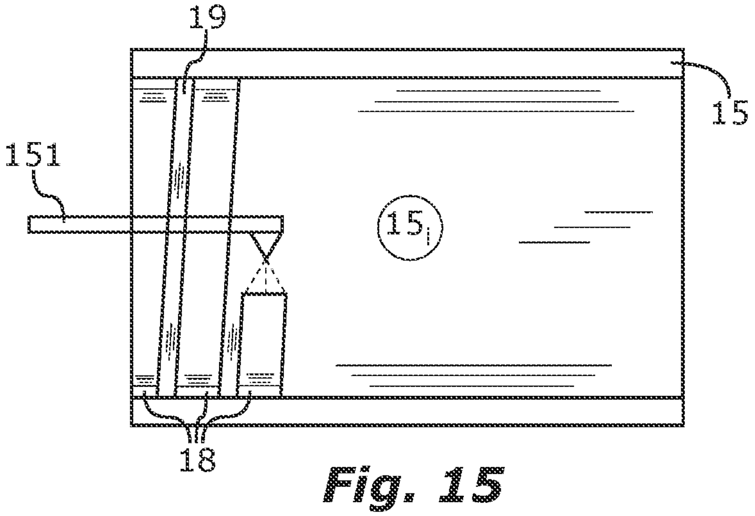

FIG. 15 is a cross-sectional side-view of a step 150 in a method of making an enclosure for an x-ray tube, including forming a coating-ring 18 and an interruption-ring 19 by depositing a coating on the inner-face with a spray tool 151, and adjusting the time and/or flowrate through the spray tool 151 at different locations to give different thicknesses of the coating, or locations with and without the coating.

DEFINITIONS

The following definitions, including plurals of the same, apply throughout this patent application.

As used herein, the terms “on”, “located on”, “located at”, and “located over” mean located directly on or located over with some other solid material between. The terms “located directly on”, “adjoin”, “adjoins”, and “adjoining” mean direct and immediate contact.

As used herein, the phrase “same material composition” means exactly the same, the same within normal manufacturing tolerances, or nearly exactly the same, such that any deviation from exactly the same would have negligible effect for ordinary use of the device.

As used herein, the term “tube” is not limited to a cylinder shape. The term “x-ray tube” is used because this is the normal term used for this x-ray device.

Unless explicitly noted otherwise herein, all temperature-dependent values are such values at 25° C.

DETAILED DESCRIPTION

As illustrated in FIGS. 1-5, 9, and 10, x-ray tubes 10, 20, 30, 40, 50, 90, and 100 include an enclosure attached to a cathode 11 and an anode 12, and electrically insulating the cathode 11 from the anode 12. Example materials of the enclosure include glass or ceramic (e.g. aluminum oxide). There can be a vacuum inside of the enclosure.

The enclosure, the cathode 11, and the anode 12 can define and form a housing that is hermetically sealed and capable of maintaining a vacuum therein. The enclosure can include a cylinder 15, disc(s) 62, or both. A hole can extend through a core of the cylinder 15. The term “cylinder” is used because this is a common shape; but the cylinder 15 can have other shapes. For example, the cylinder 15 can have a hollow conical frustum shape.

Transmission-target x-ray tubes 10, 20, 30, 40, 50, 90, and 100 are shown in the drawings, but the invention is equally applicable to reflection-target or side-window x-ray tubes.

The cathode 11 can include an electron-emitter $\mathbf{11}_{EE}$ (e.g. filament) for emitting electrons towards the anode 12. The anode 12 can include a target 14 (e.g. gold, rhodium, tungsten) for generation of x-rays. Electrons impinging on the target 14 can generate x-rays. The x-rays can emit out of the x-ray tube through an x-ray window 13.

Some electrons can rebound, and fail to form x-rays. These electrons can cause an electrical charge to build-up on an inner-face of the enclosure, such as on an inner-face $15_i$ of the cylinder 15 and/or on an inner-face $62_i$ of the disc(s) 62. The charge build-up can cause sharp voltage gradients within the enclosure, which can cause arcing failure of the x-ray tube. The inner-face of the enclosure can be the interior face of the enclosure facing inwardly towards a cavity of the x-ray tube.

The electrical charge can build unevenly on the inner-face of the enclosure. This uneven charge can shift the electron beam away from a center of the target 14. As a result of this shift, x-rays can emit from different locations of the target 14. Aiming a moving, or non-centered, x-ray beam can be difficult.

A triple-point is formed at a junction of (a) the enclosure, (b) an internal vacuum inside of the enclosure, and (c) the cathode 11 or anode 12. The triple-point can have high stress and large electric field gradients. Arcing failure of the x-ray tube can result from such high stress and large electric field gradients at the triple-point.

A coating-ring 18 and an interruption-ring 19 at the inner-face of the enclosure can reduce electrical charge build-up, avoid uneven electrical charge build-up, and can protect the triple-point. The coating-ring 18 and the interruption-ring 19 can be on the inner-face $15_i$ of the cylinder 15, the inner-face $62_i$ of the disc 62 of the cathode 11, the inner-face $62_i$ of the disc 62 of the anode 12, or combinations thereof.

Part or all of the inner-face of the enclosure can be coated with an electrically resistive material, which can form a coating-ring 18. The coating-ring 18 can have a lower bulk electrical resistivity than the enclosure. The coating-ring 18 can provide a path for electrons on the inner-face of the enclosure to flow to ground. The coating-ring 18 can have surface resistivity (e.g. $10^{10}$-$10^{14}$ Ohm per square) selected to allow only a small electrical current between cathode 11 and anode 12.

The coating-ring 18 can adjoin the cathode 11 or the anode 12. There can be multiple coating-rings 18, with one adjoining the cathode 11 and another adjoining the anode 12.

As illustrated in FIG. 4, material 45 of the coating-ring 18 can also coat an exterior of the cylinder 15 (part or all of the exterior). This material can extend between the cathode 11 and the cylinder 15, between the anode 12 and the cylinder 15, or both. Thus, this material 45 can be continuous from the coating-ring 18 to the exterior of the cylinder 15. This material in these locations can help protect the triple point.

The coating-ring 18 can encircle a longitudinal-axis 16 of the enclosure. The longitudinal-axis 16 can extend between and through the cathode 11 and the anode 12. The longitudinal-axis 16 can extend between and through the electron-emitter $\mathbf{11}_{EE}$ and the target 14. The longitudinal-axis 16 can be at a center of an electron beam and the cylinder 15.

An interruption-ring 19 at the inner-face of the enclosure can improve electric-field lines inside the enclosure. The interruption-ring 19 can provide a ring of higher electrical resistance per unit length, parallel to the longitudinal-axis 16, relative to the coating-ring 18. The interruption-ring 19 can pull electrical fields away from the triple-point, for protection of the triple-point. The interruption-ring 19 can be placed and sized for shaping of the electron-beam.

The interruption-ring 19 can be distinct from the coating-ring 18. The interruption-ring 19 can be structurally and dimensionally distinct or different from the coating-ring 18. For example, the interruption-ring 19 can have a different thickness and/or a different width than the coating-ring 18. The interruption ring 19 can be chemically distinct or different than the coating-ring 18. For example, the interruption ring 19 can comprise a different material than the coating-ring 18. The interruption-ring 19 can be located at a distinct or different location than the coating-ring 18. For example, the interruption ring 19 can be located at a different longitudinal and/or radial location than the coating ring 18.

The coating-ring 18 and the interruption-ring 19 can form a series electric-current-path 51 at the inner-face of the enclosure and between the anode 12 and the cathode 11, between the electron-emitter $\mathbf{11}_{EE}$ and the target 14, between the electron-emitter $\mathbf{11}_{EE}$ and the x-ray window 13, or combinations thereof. The electric-current-path 51 can extend longitudinally along a length of the cylinder 15 (see FIGS. 1-5). The electric-current-path 51 can extend radially between the cylinder 15 and the electron-emitter $\mathbf{11}_{EE}$ (see FIG. 9). The electric-current-path 51 can extend radially between the cylinder 15 and the target 14 and/or the x-ray window 13 of the anode 12 (see FIG. 10).

The relatively higher electrical resistance per unit length of the interruption-ring 19 can help shape electrical field lines. Example resistance relationships, between the coating-ring 18 and the interruption-ring 19, include $R_C<R_I$, $2*R_C<R_I$, $10*R_C<R_I$, $100*R_C<R_I$, $1000*R_C<R_I$, $10{,}000*R_C<R_I$. "$R_C$" is electrical resistance per unit length through the coating-ring 18. "$R_I$" is electrical resistance per unit length through the interruption-ring 19.

A smooth, linear, or gradual transition of electrical resistance per unit length, between $R_C$ and $R_I$, can reduce sharp electrical field gradients. Electrical field gradients can also be reduced by multiple, small changes of electrical resistance per unit length, between $R_C$ and $R_I$. As illustrated in FIGS. 1 and 3, there can be a transition-region 17 between the interruption-ring 19 and the coating-ring 18. The transition-region 17 can have an intermediate thickness or material between that of the interruption-ring 19 and the coating-ring 18. Thus, the transition-region 17 can provide a smooth transition of electrical resistance per unit length between $R_I$ and $R_C$.

The coating-ring 18 can have a lower bulk electrical resistivity than the enclosure, thus providing a path of lower resistance for electrons on an interior of the enclosure to flow to ground. Thus, $\rho_C<\rho_E$, where $\rho_C$ is bulk electrical resistivity of the coating-ring 18 and $\rho_E$ is bulk electrical resistivity of the enclosure. The interruption-ring 19 can have bulk electrical resistivity that is higher than or equal to bulk electrical resistivity of the coating-ring 18. Thus, $\rho_I\geq\rho_C$, where $\rho_I$ is a bulk electrical resistivity of the interruption-ring 19. The interruption-ring 19 can have a bulk electrical resistivity that is lower than or equal to that of the enclosure ($\rho_I\leq\rho_E$).

The coating-ring 18 and the interruption-ring 19 can be on the inner-face $15_i$ of the cylinder 15, at an inner-face $62_i$ of a disc 62 encircling at least part of the cathode 11, at an inner-face $62_i$ of the disc 62 encircling at least part of the anode 12, or combinations thereof. The disc(s) 62 can be oriented perpendicular to the longitudinal axis 16. The cylinder 15 and/or the disc(s) 62 can be electrically insulative. The cylinder 15 and/or the disc(s) 62 can form the enclosure and can electrically insulate the cathode 11 from the anode 12.

FIGS. 1-5 show the coating-ring 18 and the interruption-ring 19 on the inner-face $15_i$ of the cylinder 15. As illustrated in FIGS. 1-4, the interruption-ring 19 can encircle the longitudinal-axis 16 at a different location along the longitudinal-axis 16 with respect to the coating-ring 18. As illustrated in FIG. 5, the interruption-ring 19 and the coating-ring 18 can be adjacent, helical rings on the inner-face $15_i$ of the cylinder 15.

FIGS. 6-10 show the coating-ring 18 and the interruption-ring 19 on an inner-face $62_i$ of an electrically insulative disc 62. As illustrated in FIGS. 6-10, the interruption-ring 19 can encircle the longitudinal-axis 16 at the same location along the longitudinal-axis 16 with respect to the coating-ring 18. As illustrated in FIGS. 6-7 and 9-10, the interruption-ring 19 can encircle the longitudinal-axis 16 at a different radius from the longitudinal-axis 16 than the coating-ring 18. As illustrated in FIG. 8, the interruption-ring 19 and the coating-ring 18 can be adjacent, spiral rings on the inner-face $62_i$ of the electrically insulative disc 62.

The disc 62 can encircle a region 61. As illustrated in FIG. 9, the region 61 can be at least part of the cathode 11, and the coating-ring 18 and the interruption-ring 19 can be on an inner-face $62_i$ of the disc 62 that faces a target material 14 at the anode 12. As illustrated in FIG. 10, the region 61 can be at least part of the anode 11, and the coating-ring 18 and the interruption-ring 19 can be on an inner-face $62_i$ of the disc 62 that faces the cathode 11.

As illustrated in FIGS. 1, 2, and 4, an interruption-ring 19 can be closer to the anode 12 than to the cathode 11. As illustrated in FIGS. 1-2, any or all interruption-rings 19 can be closer to the anode 12 than to the cathode 11. As illustrated in FIGS. 3-4, an interruption-ring 19 can be closer to the cathode 11 than to the anode 12. As illustrated in FIG. 3, any or all interruption-rings 19 can be closer to the cathode 11 than to the anode 12. A choice between these different interruption-ring 19 locations can be made based on desired shaping of the electric potential lines.

As illustrated in FIGS. 2-4, and 6, the interruption-ring 19 can interrupt the coating-ring 18, forming at least two separate coating-rings 18 on each of two opposite sides of the interruption-ring 19. A series electric-current-path 51 can thus be through one of the coating-rings 18, through the interruption-ring 19, then through the other coating-ring 18.

As illustrated in FIGS. 4 and 6, the coating-ring 18 can interrupt the interruption-ring 19, forming at least two separate interruption-rings 19 on each of two opposite sides of the coating-ring 18. A series electric-current-path 51 can thus be through one of the interruption-rings 19, through the coating-ring 18, then through the other interruption-ring 19. Also illustrated in FIGS. 4 and 6, there can be multiple coating-rings 18 and multiple interruption-rings 19.

As illustrated in FIGS. 1-4 and 6-7, the coating-ring 18 and the interruption-ring 19 can have a circular shape.

As illustrated in FIGS. 5 and 8, the coating-ring 18 and the interruption-ring 19 can be adjacent helical or spiral shapes. The helical or spiral shapes can be uninterrupted. A series electric-current-path 51 can cross the helical or spiral shape of both the interruption-ring 19 and the coating-ring 18 multiple times.

A choice between the number of interruption-rings 19 and the number of coating-rings 18, and whether they have a circular shape, a helical shape, or a spiral shape, can be made based on desired shaping of the electric-field lines and ease of manufacturing.

As illustrated in FIGS. 3, 4, and 5, the interruption-ring 19 can be a ring without material of the coating-ring 18. This design may be applied to any other enclosure examples herein.

As illustrated in FIGS. 1-2, the interruption-ring 19 can contain the same chemical elements as the coating-ring 18, or a material composition of the interruption-ring 19 can be the same as a material composition of the coating-ring 18; but a thickness $Th_{19}$ of the interruption-ring 19 can be less than a thickness $Th_{18}$ of the coating-ring 18. For example, $Th_{19}<Th_{18}$, $R_C<R_I$, $\rho_I=\rho_C$, or combinations thereof. The smaller material thickness $Th_{19}$ at the interruption-ring 19 ($Th_{19}<Th_{18}$) may be applied to any other enclosure examples herein.

A choice between the designs of FIGS. 1-5 can be made based on ease of manufacturing and desired shaping of the electric-field lines.

A smooth, linear, or gradual transition change of material thickness between the thickness $Th_{19}$ of the interruption-ring 19 and the thickness $Th_{18}$ of the coating-ring 18 can reduce sharp electrical field gradients.

As illustrated in FIGS. 1 and 3, the transition-region 17 can contain the same chemical elements as the coating-ring 18 and the interruption-ring 19. The transition-region 17 can have the same material composition as the coating-ring 18 and the interruption-ring 19.

The transition-region can have a smooth change of thickness $Th_{17}$ from the thickness $Th_{18}$ of the coating-ring 18 to the thickness $Th_{19}$ of the interruption-ring 19 ($Th_{19}=0$ in FIG. 3).

The transition-region 17 can be applied to any other examples described herein.

The coating-ring 18 and the interruption-ring 19 can have the same material composition. For example, the interruption-ring 19 in FIG. 2 can be formed by coating the inner-face of the enclosure, then grinding, blasting, or wiping away part of the coating. The coating-ring 18 and the interruption-ring 19 can include titanium oxide, chromium oxide, or both.

The coating-ring 18 and the interruption-ring 19 can have a different material composition with respect to each other. For example, the interruption-rings 19 in FIGS. 3, 4 and 5 can be formed by removing all of the coating, or by not applying the coating at the inner-face of the enclosure in the desired location of the interruption-ring 19. Thus, for example, the coating-ring 18 can include titanium oxide, chromium oxide, or both, and the interruption-ring 19 can be free of titanium oxide, chromium oxide, or both. As another example, the coating-ring 18 and the interruption-ring 19 can have different metal oxides with respect to each other (i.e. no metal oxides in common).

A width $W_I$ of the interruption-ring 19 can be about 12% of a width $W_C$ of the cylinder 15 between the cathode 11 and the anode 12. For example, $0.01\le W_I/W_C$, $0.05\le W_I/W_C$, or $0.10\le W_I/W_C$; and $W_I/W_C\le 0.15$, $W_I/W_C\le 0.20$, $W_I/W_C\le 0.40$, $W_I/W_C\le 0.60$, $W_I/W_C\le 0.90$. $W_I$ is a width of the interruption-ring 19, and $W_C$ is a width of the cylinder 15 between the cathode 11 and the anode 12, each measured parallel to the longitudinal-axis 16 (see FIGS. 2 and 4). If there are multiple interruption-rings 19, each can have a width $W_I$ within the boundaries described in this paragraph.

Width $W_I$, thickness $Th_{19}$, location, and material of the interruption-ring 19 can be adjusted for desired resistivity to control high voltage fields and the flow of electrons along the inner-face of the enclosure.

A representation of half x-ray tubes 110 and 120, plus equipotential lines 123, are illustrated in FIGS. 11-12. Half x-ray tube 110 has a coating-ring 18, but no interruption-ring 19. Half x-ray tube 120 has a coating-ring 18 and an interruption-ring 19. The interruption-ring 19 of half x-ray tube 120 is close to the anode 12, like x-ray tube 20.

The equipotential lines 123 near the triple-point 121 of half x-ray tube 110 are closer to each other than those of half x-ray tube 120. Thus, the interruption-ring 19 of half x-ray tube 120 protects the triple-point 121 by spacing out equipotential lines 123 near the triple-point 121.

Equipotential lines 123 in half x-ray tube 120 converge due to the interruption-ring 19 at location 122. This convergence of equipotential lines 123 can be moved to different locations to shape or direct the electron beam. Thus, location, size, and resistance of the interruption-ring 19 is a tool for improving the design of the x-ray tube.

Method

A method of making an enclosure to insulate a cathode 11 from an anode 12 in an x-ray tube, such as the enclosure described above, can comprise some or all of the following steps. The enclosure, the coating-ring 18, and the interruption-ring 19 can have properties as described above. The cylinder 15 is illustrated in FIGS. 13-15, but it can be replaced by the disc 62.

The method can comprise: (a) forming a coating-ring 18 and an interruption-ring 19 at an inner-face of the enclosure (see FIGS. 13-15); and (b) creating an electric-current-path 51 through the coating-ring 18 and the interruption-ring 19 in series (see FIGS. 1-8).

The coating-ring 18 and the interruption-ring 19 can each encircle a longitudinal-axis 16 of the enclosure, such as the cylinder 15, at different locations along the longitudinal-axis 16 with respect to each other, as illustrated in FIGS. 1-5. The coating-ring 18 and the interruption-ring 19 can each encircle the longitudinal-axis 16 of the enclosure, such as the disc 62, at a different radius outward from the longitudinal-axis 16 with respect to each other, as illustrated in FIGS. 6-10.

Forming the coating-ring 18 and the interruption-ring 19 can include masking a ring at the inner-face of the enclosure and coating an un-masked part of the inner-face. As illustrated in FIG. 13, mask 139 blocks deposition tool 131 from coating regions covered by this mask 139. After forming the coating-ring 18 in unmasked areas by depositing material from the deposition tool 131, the mask 139 may be removed, revealing the interruption-ring 19. Thus, the interruption-ring 19 can be under the masked part of the inner-face, and can be free of the coating. Thus, the interruption-ring 19 can have (a) higher bulk electrical resistivity than the coating-ring 18 ($\rho_I > \rho_C$); (b) higher electrical resistance, per unit of length, than the coating-ring 18 ($R_I > R_C$); and/or (c) bulk electrical resistivity that is equal to that of the enclosure ($\rho_I = \rho_E$).

Forming the coating-ring 18 and the interruption-ring 19 can include coating the inner-face of the enclosure, then removing part or all of a ring of the coating to form the interruption-ring 19. As illustrated in FIG. 14, removal tool 141, such as a brush, rag, sand blaster, grinder, or chemical sprayer, can remove material to form the interruption-ring 19. Example methods of this removal include grinding, blasting, wiping off the coating, and chemical removal. The coating might be easier to remove prior to firing the coating in an oven. See FIGS. 1-10.

If part of a thickness of a ring of the coating is removed by removal tool 141 to form the interruption-ring 19, then (a) the interruption-ring 19 can have bulk electrical resistivity equal to the coating-ring 18 ($\rho_I = \rho_C$); (b) the interruption-ring 19 can have higher electrical resistance per unit length than the coating-ring 18 ($R_I > R_C$); and/or (c) both the coating-ring 18 and the interruption-ring 19 have a bulk electrical resistivity that is less than that of the enclosure ($\rho_I < \rho_E$ and $\rho_C < \rho_E$). See FIG. 2.

If all of a ring of the coating is removed by removal tool 141 to form the interruption-ring 19, then the interruption-ring 19 can have (a) higher bulk electrical resistivity than the coating-ring 18 ($\rho_I > \rho_C$); (b) higher electrical resistance, per unit of length, than the coating-ring 18 ($R_I > R_C$); and/or (c) bulk electrical resistivity that is equal to that of the enclosure ($\rho_I = \rho_E$).

Forming the coating-ring 18 and the interruption-ring 19 can include depositing the coating on the inner-face with a tapered thickness. This could be done by masking, deposition time, or adjusting other coating distribution properties of the coating tool.

A spray tool 151, as shown in FIG. 15, can deposit the coating-ring 18, and also possibly a thinner region for the interruption-ring 19. This spray tool 151 can form a helical or spiral coating, as shown in FIGS. 5 and 8. By adjusting the time or volumetric flowrate of the spray tool 151 in different regions, the transition-region 17 can be formed, as shown in FIGS. 1 and 3.

What is claimed is:

1. An x-ray tube comprising:

a cathode and an anode electrically insulated from one another, the cathode configured to emit electrons towards the anode, and the anode configured to emit x-rays out of the x-ray tube in response to impinging electrons from the cathode;

an enclosure attached to the cathode and the anode, the enclosure electrically-insulating the cathode from the anode;

the enclosure, the cathode, and the anode form a housing that is hermetically sealed;

a coating-ring on and adjoining an inner-face of the enclosure, the coating-ring encircling a longitudinal-axis of the enclosure, the longitudinal-axis extending between the cathode and the anode;

an interruption-ring located at the inner-face of the enclosure, the interruption-ring encircling the longitudinal-axis, the interruption-ring being distinct from the coating-ring;

the coating-ring and the interruption-ring each have a circular shape;

a series electric-current-path through the coating-ring and the interruption-ring between the anode and the cathode;

$R_I > R_C$, where $R_I$ is electrical resistance per unit length through the interruption-ring and $R_C$ is electrical resistance per unit length through the coating-ring, both measured parallel to the longitudinal-axis;

$\rho_C < \rho_E$, where $\rho_C$ is a bulk electrical resistivity of the coating-ring and PE is a bulk electrical resistivity of the enclosure;

the enclosure includes a cylinder with a hole extending through a core of the cylinder;

the inner-face of the enclosure is an inner-face of the cylinder;

the interruption-ring encircles the longitudinal-axis at a different location along the longitudinal-axis than the coating-ring;

material of the coating-ring coats at least part of an exterior of the cylinder;

the material of the coating-ring is continuous from the coating-ring to the exterior of the cylinder;

a triple-point is formed at a junction of the cylinder, an internal vacuum inside of the cylinder, and the cathode; and the material of the coating-ring extends between the cathode and the cylinder, thus helping to protect the triple point.

2. The x-ray tube of claim 1, wherein the enclosure includes glass or ceramic.

3. The x-ray tube of claim 1, wherein the interruption-ring interrupts the coating-ring, forming two separate coating-rings with each of the two separate coating-rings on each of two opposite sides of the interruption-ring.

4. The x-ray tube of claim 1, wherein the coating-ring interrupts the interruption-ring, forming two separate interruption-rings with each of the two separate interruption-rings on each of two opposite sides of the coating-ring.

5. The x-ray tube of claim 1, wherein the coating-ring includes titanium oxide and chromium oxide, and the interruption-ring is free of titanium oxide and chromium oxide.

6. An x-ray tube comprising:

a cathode and an anode electrically insulated from one another, the cathode configured to emit electrons towards the anode, and the anode configured to emit x-rays out of the x-ray tube in response to impinging electrons from the cathode;

an enclosure attached to the cathode and the anode, the enclosure electrically-insulating the cathode from the anode;

the enclosure, the cathode, and the anode form a housing that is hermetically sealed;

a coating-ring on and adjoining an inner-face of the enclosure, the coating-ring encircling a longitudinal-axis of the enclosure, the longitudinal-axis extending between the cathode and the anode;

an interruption-ring located at the inner-face of the enclosure, the interruption-ring encircling the longitudinal-axis, the interruption-ring being distinct from the coating-ring;

the coating-ring and the interruption-ring each have a circular shape;

a series electric-current-path through the coating-ring and the interruption-ring between the anode and the cathode;

$R_I > R_C$, where $R_I$ is electrical resistance per unit length through the interruption-ring and $R_C$ is electrical resistance per unit length through the coating-ring, both measured parallel to the longitudinal-axis;

$\rho_C < \rho_E$, where $\rho_C$ is a bulk electrical resistivity of the coating-ring and $\rho_E$ is a bulk electrical resistivity of the enclosure;

the enclosure includes a cylinder with a hole extending through a core of the cylinder;

the inner-face of the enclosure is an inner-face of the cylinder;

the interruption-ring encircles the longitudinal-axis at a different location along the longitudinal-axis than the coating-ring;

material of the coating-ring coats at least part of an exterior of the cylinder;

the material of the coating-ring is continuous from the coating-ring to the exterior of the cylinder;

a triple-point is formed at a junction of the cylinder, an internal vacuum inside of the cylinder, and the anode; and the material of the coating-ring extends between the anode and the cylinder, thus helping to protect the triple point.

7. The x-ray tube of claim 6, wherein the enclosure includes glass or ceramic.

8. The x-ray tube of claim 6, wherein the interruption-ring interrupts the coating-ring, forming two separate coating-rings with each of the two separate coating-rings on each of two opposite sides of the interruption-ring.

9. The x-ray tube of claim 6, wherein the coating-ring interrupts the interruption-ring, forming two separate interruption-rings with each of the two separate interruption-rings on each of two opposite sides of the coating-ring.

10. The x-ray tube of claim 6, wherein the coating-ring includes titanium oxide and chromium oxide, and the interruption-ring is free of titanium oxide and chromium oxide.

11. An x-ray tube comprising:

a cathode and an anode electrically insulated from one another, the cathode configured to emit electrons towards the anode, and the anode configured to emit x-rays out of the x-ray tube in response to impinging electrons from the cathode;

an enclosure attached to the cathode and the anode, the enclosure electrically-insulating the cathode from the anode;

the enclosure includes glass or ceramic;

an interruption-ring and two separate coating-rings, the interruption-ring interrupts the two separate coating-rings with each of the two separate coating-rings on each of two opposite sides of the interruption-ring;

a series electric-current-path between the anode and the cathode at an inner-face of the enclosure, the series electric-current-path including one of the two separate coating-rings, the interruption-ring, then the other of the two separate coating-rings;

$R_I > R_C$, where $R_I$ is electrical resistance per unit length through the interruption-ring and $R_C$ is electrical resistance per unit length through each of the two separate coating-rings, both measured along the electric-current path;

$\rho_C < \rho_E$, where $\rho_C$ is a bulk electrical resistivity of the two separate coating-rings and $\rho_E$ is a bulk electrical resistivity of the enclosure;

the coating-rings encircle longitudinal-axis of the enclosure, the two separate coating-rings are on the inner-face, the interruption-ring encircles the longitudinal-axis, and the interruption-ring is distinct from the two separate coating-rings;

the enclosure includes a cylinder with a hole extending through a core of the cylinder;

the inner-face of the enclosure is an inner-face of the cylinder;

the interruption-ring encircles the longitudinal-axis at a different location along the longitudinal-axis than the coating-rings;

material of the two separate coating-rings coats at least part of an exterior of the cylinder;

the material of at least one of the two separate coating-rings is continuous from the at least one of the two separate coating-rings to the exterior of the cylinder;

a triple-point is formed at a junction of the cylinder, an internal vacuum inside of the cylinder, and the cathode; and the material of the at least one of the two separate coating-rings extends between the cathode and the cylinder, thus helping to protect the triple point.

12. The x-ray tube of claim 11, wherein the enclosure, the cathode, and the anode form a housing that is hermetically sealed and capable of maintaining a vacuum therein.

13. The x-ray tube of claim 11, wherein the two separate coating-rings and the interruption-ring each have a circular shape.

14. The x-ray tube of claim 11, wherein the two separate coating-rings include titanium oxide and chromium oxide, and the interruption-ring is free of titanium oxide and chromium oxide.

15. An x-ray tube comprising:

a cathode and an anode electrically insulated from one another, the cathode configured to emit electrons towards the anode, and the anode configured to emit x-rays out of the x-ray tube in response to impinging electrons from the cathode;

an enclosure attached to the cathode and the anode, the enclosure electrically-insulating the cathode from the anode;

the enclosure includes glass or ceramic;

an interruption-ring and two separate coating-rings, the interruption-ring interrupts the two separate coating-rings with each of the two separate coating-rings on each of two opposite sides of the interruption-ring;

a series electric-current-path between the anode and the cathode at an inner-face of the enclosure, the series electric-current-path including one of the two separate coating-rings, the interruption-ring, then the other of the two separate coating-rings;

$R_I > R_C$, where $R_I$ is electrical resistance per unit length through the interruption-ring and $R_C$ is electrical resistance per unit length through each of the two separate coating-rings, both measured along the electric-current path;

$\rho_C < \rho_E$, where $\rho_C$ is a bulk electrical resistivity of the two separate coating-rings and PE is a bulk electrical resistivity of the enclosure;

the two separate coating-rings encircle a longitudinal-axis of the enclosure, the two separate coating-rings are on the inner-face, the interruption-ring encircles the longitudinal-axis, and the interruption-ring is distinct from the two separate coating-rings;

the enclosure includes a cylinder with a hole extending through a core of the cylinder;

the inner-face of the enclosure is an inner-face of the cylinder;

the interruption-ring encircles the longitudinal-axis at a different location along the longitudinal-axis than the two separate coating-rings;

material of the two separate coating-rings coats at least part of an exterior of the cylinder;

the material of at least one of the two separate coating-rings is continuous from the at least one of the two separate coating-rings to the exterior of the cylinder;

a triple-point is formed at a junction of the cylinder, an internal vacuum inside of the cylinder, and the anode; and the material of the at least one of the two separate coating-rings extends between the anode and the cylinder, thus helping to protect the triple point.

16. The x-ray tube of claim 15, wherein the enclosure, the cathode, and the anode form a housing that is hermetically sealed and capable of maintaining a vacuum therein.

17. The x-ray tube of claim 15, wherein the two separate coating-rings and the interruption-ring each have a circular shape.

18. The x-ray tube of claim 15, wherein the two separate coating-rings include titanium oxide and chromium oxide, and the interruption-ring is free of titanium oxide and chromium oxide.

* * * * *